Feb. 16, 1926.

M. L. WOOD

PERCOLATOR COFFEEPOT

Filed Nov. 2, 1925

1,573,668

Inventor
M. L. Wood
by Wilkinson & Giusta
Attorneys.

Patented Feb. 16, 1926.

1,573,668

UNITED STATES PATENT OFFICE.

MOSES LINDLEY WOOD, OF WASHINGTON, DISTRICT OF COLUMBIA.

PERCOLATOR COFFEEPOT.

Application filed November 2, 1925. Serial No. 66,303.

*To all whom it may concern:*

Be it known that I, MOSES LINDLEY WOOD, a citizen of the United States, residing at Washington, District of Columbia, have invented certain new and useful Improvements in Percolator Coffeepots; and I do hereby declare the following to be a full, clear, and exact description of the invention, such as will enable others skilled in the art to which it appertains to make and use the same.

My present invention relates to improvements in coffee pots of the percolating type, and it is intended to provide a cheap and efficient means of changing existing pots to make them efficient, which may be very cheaply attached thereto.

My invention will be more fully understood after reference to the accompanying drawings, in which like parts are indicated by similar reference symbols throughout the several views, and in which.

A represents a coffee pot of any usual or preferred shape, preferably cylindrical in cross-section and having the closed bottom A' and the perforations $a^0$ registering with the spout B. A suitable handle C is also provided. The upper portion of the container A is closed by the cover D, hinged as at $D^0$. This cover may be of any suitable construction, but is preferably provided with a central dome-shaped inverted glass cup D', which is made heavy enough to hold the cover ordinarily firmly on its seat, thus to prevent the escape of vapor carrying aroma from the coffee pot, except when the pressure becomes too great, in which case the cover acts as a safety valve.

The glass dome D' not only serves as a weight for the cover, but also permits the operator to inspect the contents of the coffee pot and note how it is operating, when desired.

E represents the partition plate, preferably in the form of an inverted champagne glass, having a hollow stem E' opening downward into the chamber X, formed between this plate E and the bottom A' of the coffee pot.

The stem E' is provided with an abutment e', preferably in the form of an annular flange, to support the percolator cup F, whose bottom F' is provided with a number of small perforations $f^0$, as shown, and its center is provided with a hollow axial tube $F^0$, which telescopes over the stem E'. The cup-shaped plate E is preferably provided with the radial flange e adapted to slide freely down in the cylindrical container A, to center the said plate E and its stem E' in the outer container, whereby the parts may be more conveniently assembled and disassembled.

This plate E is provided with a plurality of openings $e^0$, to permit the passage of the liquid in the coffee pot from one side of the plate E to the other, as will be hereinafter described.

The plate E is also preferably curved upwards as at $e^2$ to facilitate the operation of the device, as will be explained later.

Mounted on the lower side of the plate E are a number of flap valves, either individual for each opening or joined together, which register with the openings $e^0$. For convenience of manufacture, these valves are preferably stamped from a single integral plate H, which plate may be of any very thin resilient metal, such as spring brass, aluminum, or any other suitable metal or alloy, having the sufficient resiliency.

Figure 4:
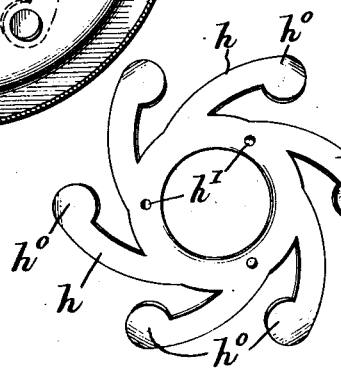
Fig. 4 is a detail view showing the preferred form of valve plate and valves adapted for use in my invention.

In order to make the valve sensitive in operation, they are carried at the end of resilient arms h, and it is possible to make these arms longer by having them arranged at a considerable angle with the radii of the plate H rather than radial, as shown most clearly in Fig. 4.

Figure 1:
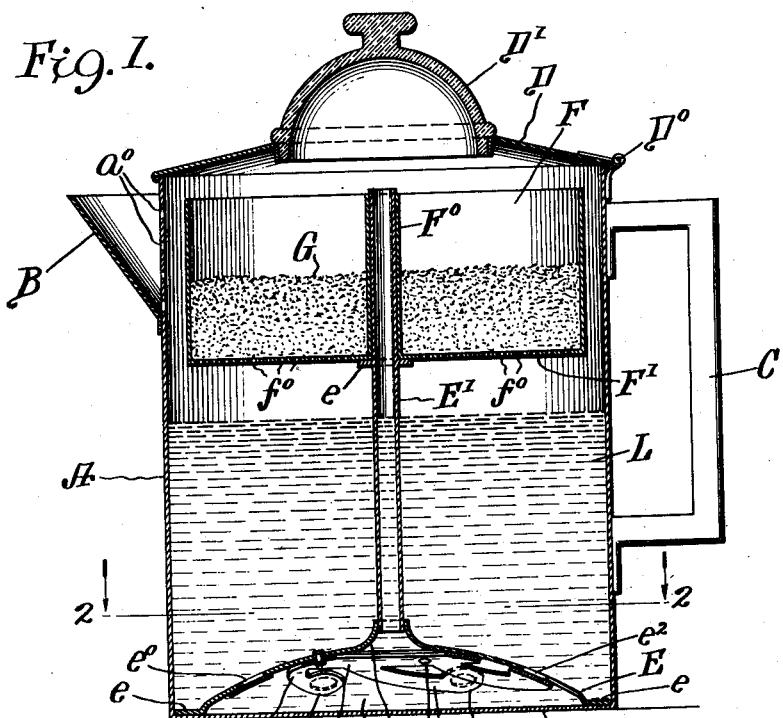
Fig. 1 shows a central vertical section through the usual complete coffee pot, with its contents as ordinarily used in practice, parts being shown in elevation, and the valves being shown in the closed position.
Figure 2:
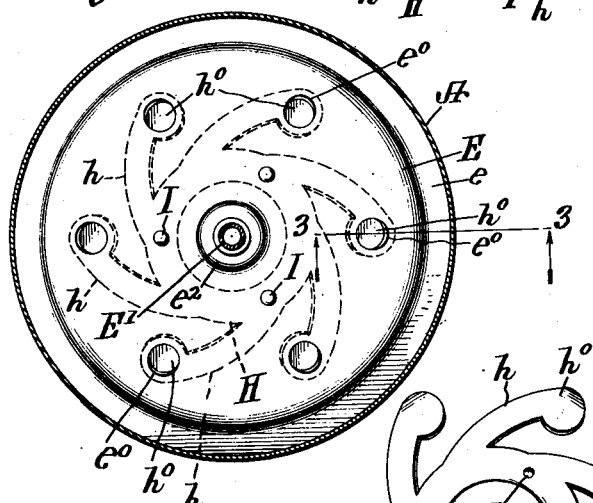
Fig. 2 shows a section through the coffee pot along the line 2—2 of Fig. 1 and looking down, the liquid contents of the coffee pot not being shown.
Figure 3:
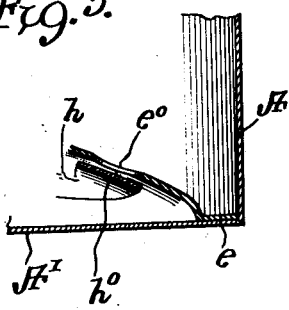
Fig. 3 is an enlarged detail view of a portion of the device shown in Fig. 1, along the line 3—3 of Fig. 2, but shows one of the valves in the open position, as when not subjected to steam pressure.

This valve plate may be attached to the lower side of the cup plate E in any convenient way, as by means of the rivets I, see Figs. 1 and 2, which pass through the rivet holes h' in the plate H, as shown in Fig. 4.

Having thus described the construction of the parts in the preferred form, the operation of the device is as follows:

Suppose the ground coffee G to be placed at the desired height in the peroclator cup F and the desired quantity of water L to be placed in the coffee pot, the cover of the pot being closed, place the pot over the stove or other heater.

The heat from the bottom passes directly into the water confined in the chamber X, heating the water in said chamber, and this hot water will rise by convection currents in the stem E'. The valves being closed, the small body of water contained in the chamber X will soon develop sufficient steam to cause a small explosion, on the well known principle of the geyser action. This will cause the steam and hot water to pass through the narrowing neck $e^2$ and up through the hollow stem E', the hot water falling back on the ground coffee G and the steam filling the upper portion of the coffee pot. After this explosion has spent itself, and its action will be only momentary, the pressure will be relieved in the chamber X, the valves will open, and in a little while there will be another explosion, with a similar geyser action. These explosive cycles will become repeated more rapidly as the entire mass of the liquid L becomes heated up, and each successive cycle will be more efficient in carrying hot water and steam up to the percolator cup. By having the openings $e^0$ spaced away from the axis of the stem, the inflowing liquid flowing into the chamber X has free access while that thrown upward through the stem is guided by the curved face $e^2$ and finds a free passageway upwards under the pressure of the generated steam. The result is that the coffee pot functions very rapidly and very efficiently.

The heavy cover will retain the vapors inside the coffee pot unless the pressure becomes excessive, and then this cover will act as a safety valve, but in practice the cover will remain closed during the process of making the coffee.

Obviously, the operator can inspect the contents of the pot through the dome D' and see whether the vapor is rising and how the coffee pot is operating, whenever desired.

After the operation has been carried along a sufficient length of time to suit the strength of the coffee desired, or the will of the operator, the coffee pot may be removed from the stove and coffee may be used therefrom in the usual way.

In order to cleanse the parts thoroughly, when desired, as for instance when the coffee pot is cold, it is a simple matter to swing the top open, take out the percolator cup F, and empty its contents and cleanse the same, grip the stem E' and remove with it the plate E and the valves, when these parts may all be thoroughly cleaned, and finally the liquid, if any, remaining in the coffee pot may be poured out and the container may be thoroughly cleansed.

In re-assembling the parts, grip the stem E', slide the cupped plate E into position shown in Fig. 1, and slip the percolator cup F over the stem E, and the parts will be ready for use.

While I have shown a weighted cover with a glass dome, a heavy metal cover might be substituted therefor, if desired.

Moreover, while I prefer to have the valve plate and valves all made of a single piece, obviously the valves may be made separately with flexible tongues straight or curved, and separately attached to the underside of the plate E.

By having these placed on the underside of the plate E, as shown in Fig. 1, they will be in a protected position and will not be so apt to clog up from solid particles of the coffee bean falling on the same, and the valve seats will be automatically cleansed by the inrush of water into the chamber X after each explosion.

While I have shown one embodiment of the invention, in the preferred form thereof, it will be obvious that various changes might be made in the construction, combination and arrangement of parts, and I do not mean to limit the invention to such details, except as particularly pointed out in the claims.

Having thus described my invention, what I claim and desire to secure by Letters Patent of the United States is:

1. In a coffee pot, the combination with a cylindrical container, and a cover therefor, of a cupped annular plate provided with a hollow stem, said plate fitting in said container and being provided with openings spaced apart from said stem, and said stem being provided with an abutment thereon, an annular percolator cup adapted to slip over said stem and to be supported on said abutment, and a cupped valve plate made of thin resilient metal secured beneath said first mentioned plate and having resilient arms terminating in flap valves registering with said openings.

2. In a coffee pot, the combination with a cylindrical container, and a hinged cover therefor provided with a transparent dome shaped central portion, of a cupped annular plate provided with a hollow stem, said plate fitting in said container and being provided with openings spaced apart from said stem, and said stem being provided with an abutment thereon, an annular percolator cup adapted to slip over said stem and to be supported on said abutment, and a cupped valve plate made of thin resilient metal secured beneath said first mentioned plate and having resilient arms terminating in flap valves registering with said openings.

3. In a coffee pot, the combination with a cylindrical container, and a hinged cover therefor provided with a transparent dome shaped central portion, of a cupped annular plate provided with a hollow stem, said plate fitting in said container and being provided with openings spaced apart from said stem, and said stem being provided with an abutment thereon, an annular percolator cup adapted to slip over said stem and to be supported on said abutment, and a series of flap valves provided with resilient connecting arms mounted beneath said plate and registering with said openings.

4. In a coffee pot, the combination with a cylindrical container, and a heavy hinged cover therefor, of a cupped annular plate provided with a hollow stem, said plate fitting in said container and being provided with openings spaced apart from said stem, and said stem being provided with an abutment thereon, an annular percolator cup adapted to slip over said stem and to be supported on said abutment, and a series of flap valves provided with resilient connecting arms mounted beneath said plate and registering with said openings.

5. In a coffee pot, the combination with a cylindrical container, and a cover therefor, of a cupped annular plate provided with a hollow stem, said plate and stem being in the form of an inverted champagne glass, said plate fitting in said container and being provided with openings spaced apart from said stem, and said stem being provided with an abutment thereon, a percolator cup adapted to slip over said stem and to be supported on said abutment, and a cupped valve plate made of thin resilient metal secured beneath said first mentoned plate and having resilient arms terminating in flap valves registering with said openings.

6. In a coffee pot, the combination with a cylindrical container, and a cover therefor, of a cupped annular plate provided with a hollow stem, said plate fitting in said container and being provided with openings spaced apart from said stem, an annular percolator cup adapted to slip over said stem, and a cupped valve plate made of thin resilient metal secured beneath said first mentioned plate and having resilient arms terminating in flap valves registering with said openings.

7. In a coffee pot, the combination with a container, of a cupped plate provided with a hollow stem, mounted in said container and being provided with openings spaced apart from said stem, and a series of flap valves provided with resilient arms attached to and mounted beneath said plate and registering with said openings.

MOSES LINDLEY WOOD.